(12) United States Patent
Kohno et al.

(10) Patent No.: US 6,957,359 B2
(45) Date of Patent: Oct. 18, 2005

(54) DATA PROCESSING APPARATUS AND DATA PROCESSING METHOD

(75) Inventors: Michimune Kohno, Tokyo (JP); Kenichi Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 09/988,920

(22) Filed: Nov. 19, 2001

(65) Prior Publication Data
US 2002/0078398 A1   Jun. 20, 2002

(30) Foreign Application Priority Data
Nov. 24, 2000   (JP) ........................... P2000-357208

(51) Int. Cl.[7] ............................................. G06F 11/00
(52) U.S. Cl. ............................ 714/6; 714/15; 714/19; 714/20
(58) Field of Search ..................... 714/6, 15, 19, 714/20

(56) References Cited

U.S. PATENT DOCUMENTS 6,131,148 A * 10/2000 West et al. .................. 711/162
6,473,775 B1 * 10/2002 Kusters et al. .............. 707/200
6,618,794 B1 *  9/2003 Sicola et al. ................ 711/154
6,708,227 B1 *  3/2004 Cabrera et al. ............. 719/328
6,732,125 B1 *  5/2004 Autrey et al. ............... 707/204

* cited by examiner

Primary Examiner—Robert Beausoliel
Assistant Examiner—Emerson Puente
(74) Attorney, Agent, or Firm—Jay H. Maioli

(57) ABSTRACT

If an incidental interruption of power supply occurs in a system, an apparatus and method is provided that a status immediately before the interruption of power supply can be stored. A request for a status-storing process is outputted from an application to a check point manager in a module. A request for an execution of a snap shot output to components, such as the application, a device driver and the like, is outputted to the manager. A sequence at this time is based on an sequence recorded in a status-storing database. The sequence represents a dependence relation between the components. When each component receives the request for the snap shot output, a function existing in a particular address for each component is read out and the component status is outputted as a snap shot file through the manager to a non-volatile memory.

9 Claims, 6 Drawing Sheets

INDEX FILE

COMPONENT NAME 1  OFFSET 1<LINE FEED>

COMPONENT NAME 2  OFFSET 2<LINE FEED>

DATA FILE

<COMPONENT 1 STATUS DATA>

<COMPONENT 2 STATUS DATA>

DATA PROCESSING APPARATUS AND DATA PROCESSING METHOD

CROSS REFERENCE TO RELATED APPLICATIONS

This application claims priority to Japanese Patent Application No. JP 2000-357208 filed in Nov. 24, 2000, the disclosure of such application being herein incorporated by reference to the extent permitted by law.

BACKGROUND OF THE INVENTION

1. Field of the Invention

The present invention relates to a data processing apparatus and a data processing method for dealing with an incidental interruption of power supply in a system.

2. Description of Related Art

Conventionally, if an incidental interruption of power supply occurs in a system controlled by a computer, recovering has been done either by restarting from a completely initial stage or by hibernation, in which contents of the memory during operation before the interruption (or, blackout) are read out and execution of operations are resumed.

However, restarting presents a problem that carrying out all processes, such as detection of devices, initialization and the like typically required long time to perform. On the other hand, in the case of the hibernation, memory information is written out irrespective of a program under execution and amount of busy memory, thus causing a problem that it took long time to store the memory condition as data as well as to recovering it. Moreover, hibernation has a problem that it cannot be executed in the background during processing and it cannot cope with the incidental interruption of power supply.

Conversely, as a method of coping with the incidental interruption of power supply such as a sudden blackout or the like, there is a method of detecting a low voltage condition and then instructing an application to end processing. However, such method requires a circuit for detecting the voltage status condition. Thus, such method has a problem in which even if the circuit for detecting the voltage condition is installed, a system software program cannot assure whether all data can be stored in time until the interruption of power supply after the generation of the low voltage condition.

However, as this method having been used as a measure against power supply interruption, so that for a case of recovering the system, this method is carried out perfectly similarly to restarting or rebooting. Hence, this has a problem that it takes a long time for recovering to an operable condition.

Therefore, the present invention has been conceived so as to provide a data processing apparatus and a data processing method, in which, even if an incidental interruption of power supply occurs in a system, it can immediately return back to a status immediately before the interruption of power supply.

SUMMARY OF THE INVENTION

A first preferred embodiment of the present invention includes a data processing apparatus provided with a central processing unit and a memory including a driver controlling an operation for writing to and reading from a recording medium, wherein when there is a request for a status-storing process from a component, a dependency relation of the component and/or stored data is stored as a snap shot file in the recording medium, and when there is a request for a status recovering process, a status of the component is recovered in accordance with the snap shot file stored in the recording medium.

A second preferred embodiment of the present invention provides a data processing method including a central processing unit and a memory, wherein an operation for writing to and reading from a recording medium is controlled by a driver, and when there is a request for a status-storing process from a component, a dependency relation of the component and/or stored data are stored as a snap shot file in the recording medium, and when there is a request for a status recovering process, a status of the component is recovered in accordance with the snap shot file stored in the recording medium.

When the status-storing process is outputted from the component, the dependency relation of the component and/or the stored data are recorded as the snap shot file in the recording medium. In the case of the occurrence of power supply interruption, the status recovery of the component is carried out from the snap shot file recorded in the recording medium, in accordance with the dependency relation of the component.

A third preferred embodiment of the invention provides a computer program for performing the steps of the data processing method of the second embodiment. Also, another embodiment describes a storage medium storing a software program in computer-readable form, in which the software program enables a computer to perform the steps of the data processing method of the second embodiment.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF THE PREFERRED EMBODIMENTS

Figure 1:
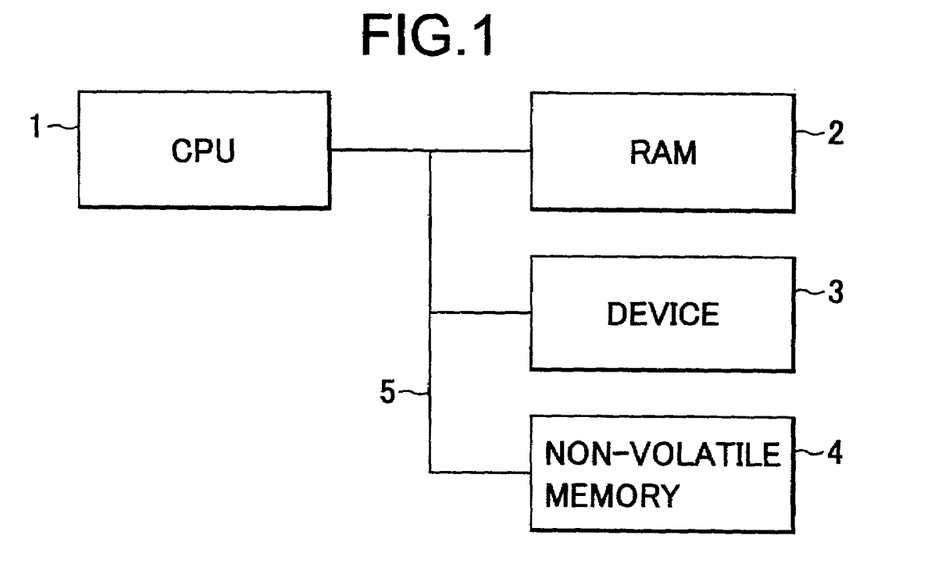
FIG. 1 is a block diagram showing a system to which the present invention can be applied.

An embodiment of the present invention will be described below with reference to the drawings. By the way, the same reference symbols are given to those having the same functions in the respective drawings, in order to avoid duplication of explanation. FIG. 1 shows a schematic block diagram of an embodiment of a system to which the present invention is applied. A system shown in FIG. 1 is provided with a CPU (Central Processing Unit) 1, a RAM (Random Access Memory) 2, a device 3, a non-volatile memory 4 and a bus 5.

The RAM 2 is a memory on which writing/reading operation can be freely performed. The device 3 is, for example, a serial device, a graphic device or the like. The non-volatile memory 4 is a non-volatile memory device, such as a flash ROM, a disc or the like. Also, the non-volatile memory 4 may be a detachable device (media), such as a flash memory card or the like, namely, a so-called IC card. The CPU 1 is connected to the RAM 2, the device 3 and the non-volatile memory 4 through the bus 5, which leads to a condition that they can be communicated with each other. Also, the bus 5 may be a network.

Figure 2:
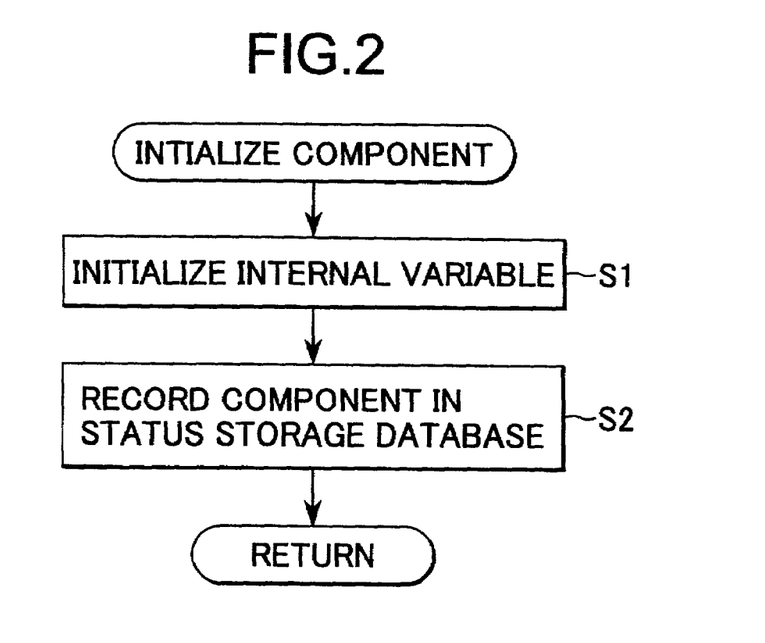
FIG. 2 is a flowchart describing an example of an initialization of a component according to a preferred embodiment of the present invention.

The control of initialization of a component provided for each function of the present invention will be described below with reference to a flowchart shown in FIG. 2. At a step S1, when a component provided for each function (hereafter, referred to simply as a component) such as an application, a device, a driver or the like is activated, an internal variable thereof is initialized. At step S2, a dependency relation between the components is recorded in a status-storing database by the component itself. At a time of a system status-storing processing as described later, the component recorded in this status-storing database is regarded as a target for the status-storing operation. In this way, the flowchart shown in FIG. 2 shows an initialization operation at a time of booting of an application, a device driver or the like.

Figure 3:
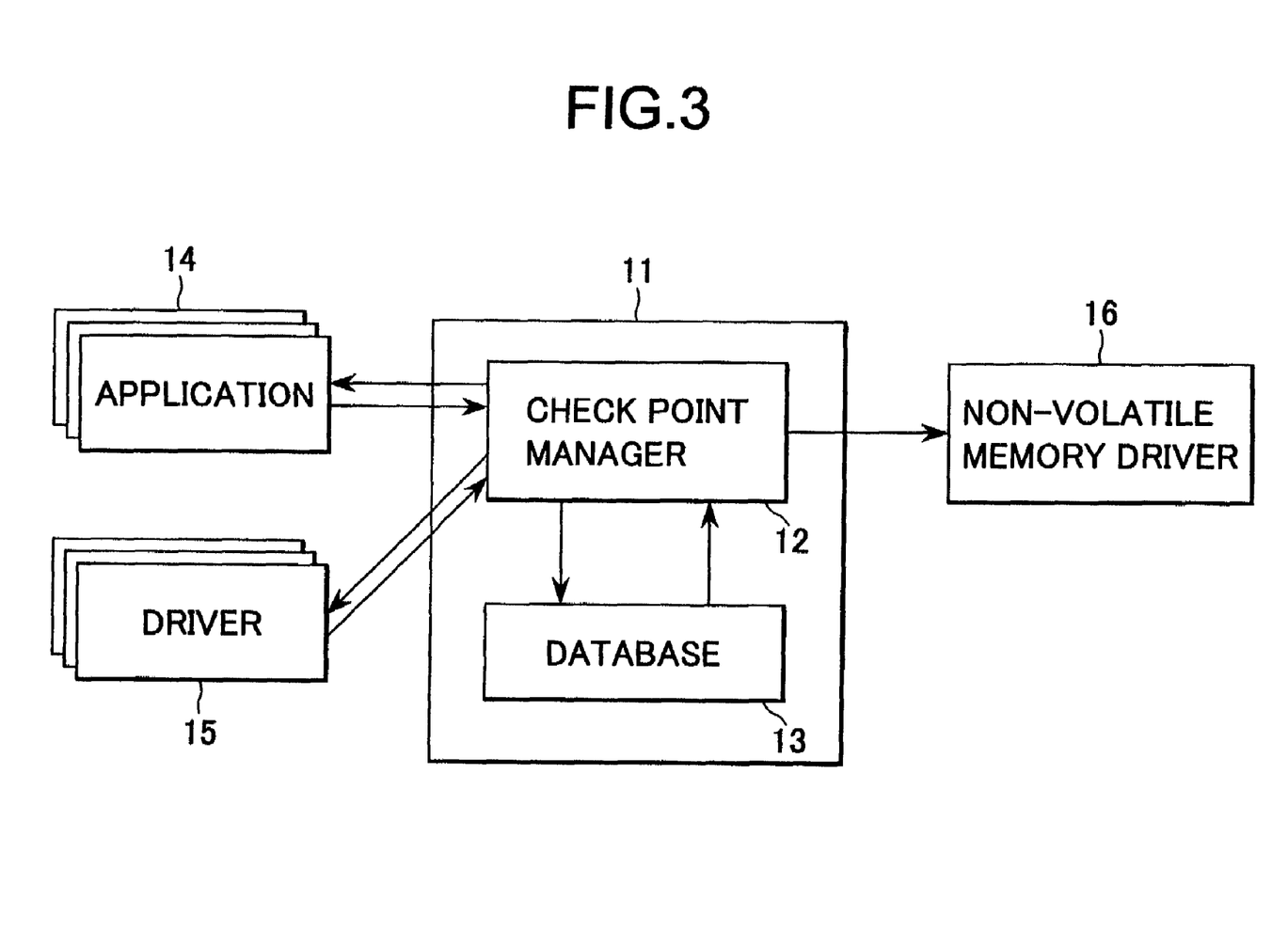
FIG. 3 is a schematic diagram describing a relation between modules for a system status-storing process according to a preferred embodiment of the present invention.

A system status-storing process will be described below with reference to FIG. 3. FIG. 3 shows the relation between modules to be executed by the CPU 1, which exist on a memory that can be accessed by the CPU 1. A request for the status-storing process is outputted from a certain application among applications 14 to a check point manager 12 in this module 11. A request for an execution of a snap shot output to the component, such as the application 14, a device driver 15 and the like, is outputted to the check point manager 12. An order or sequence in which this request is outputted is based on a sequence recorded in a status-storing database 13 in this module 11. The sequence recorded in this status-storing database 13 represents the dependence relation between the components.

When each component receives the request for the snap shot output, a function existing in a particular address for each component is read out and the component status is outputted as a snap shot data through the check point manager 12 to a non-volatile memory driver 16. When the output of the snap shot data for each component is ended, all the output snap shot data are used as snap shot files shown in FIGS. 4A, 4B, and the non-volatile memory driver 16 stores them in a recording medium (not shown). The non-volatile memory driver 16 supports an operation for writing to and reading from various recording media, for example, a non-volatile memory card. Then, the process returns back to the application 14 outputting the request for the status-storing process.

Figure 4A:
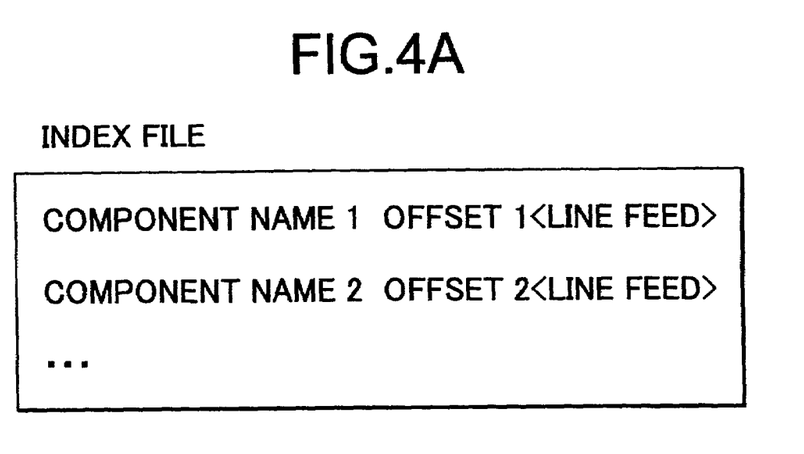
FIGS. 4A and 4B are examples of formats of a snap shot file according to a preferred embodiment of the present invention.
Figure 4B:
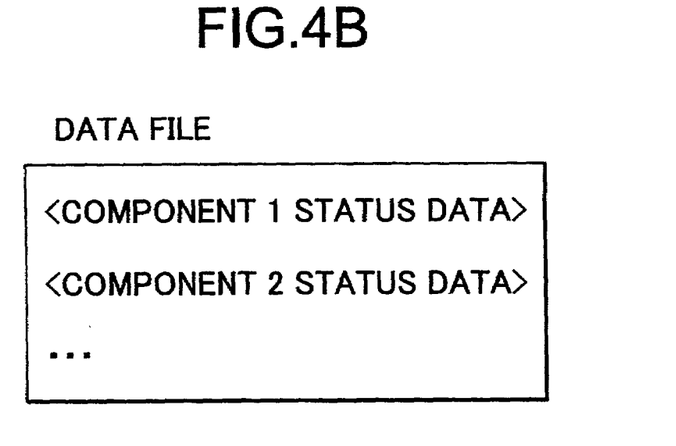

A tag of a component name (character string) shown in FIGS. 4A, 4B is given to the snap shot file, which is stored in the recording medium by the non-volatile memory driver 16, for example, as a combination of an index file and a data file. FIG. 4A shows an example of a format of the index file, and FIG. 4B shows an example of a format of the data file. As shown in FIG. 4A, the index file stores therein a component name, and an offset position in a data file of a data corresponding to the component name. As shown in FIG. 4B, the snap shot data outputted by each component is stored in the data file, in connection with one file.

As mentioned above, the status-storing process of the system is activated (booted) at arbitrary timing during the execution of the application or for each cycle specified by the system or the application. Once the status-storing process is activated, a next request for the status-storing process is kept until an end of that process.

The snap shot file to be recorded in the recording medium by the non-volatile memory driver 16 is recorded in accordance with the sequence recorded in the status-storing database 13. Thus, the dependency relation between the components is reflected.

Figure 5:
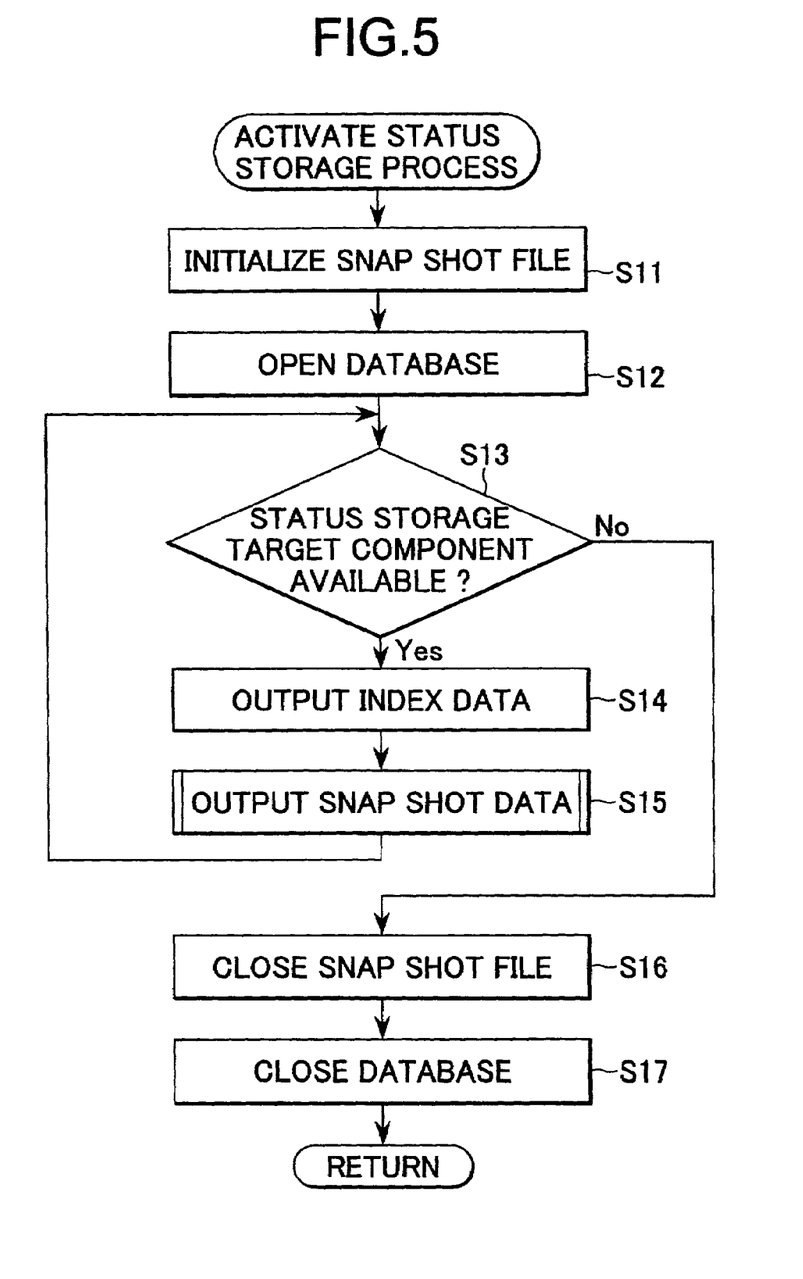
FIG. 5 is a flowchart describing an example of a status-storing process according to a preferred embodiment of the present invention.

It will be described below with reference to a flowchart of an example of the status-storing process of the system in FIG. 5. At a step S11, the snap shot file is initialized. At a step S12, the status-storing database 13 is opened. At a step S13, it is judged whether or not the component targeted for the status storing operation exists or is available. In accordance with the sequence recorded in the status-storing database 13, if it is judged that the component targeted for the status storing operation still exists, the control proceeds to a step S14. If it is judged that the component targeted for the status storing operation does not exist, the control proceeds to a step S16.

At step S14, the index data is outputted from the component targeted for the status storing operation through the check point manager 12 to the non-volatile memory driver 16. At a step S15, the snap shot data is outputted from the component targeted for the status storing operation through the check point manager 12 to the non-volatile memory driver 16.

At a step S16, the snap shot file stored in the recording medium by the non-volatile memory driver 16 is closed. At a step S17, the status-storing database 13 is closed.

Figure 6:
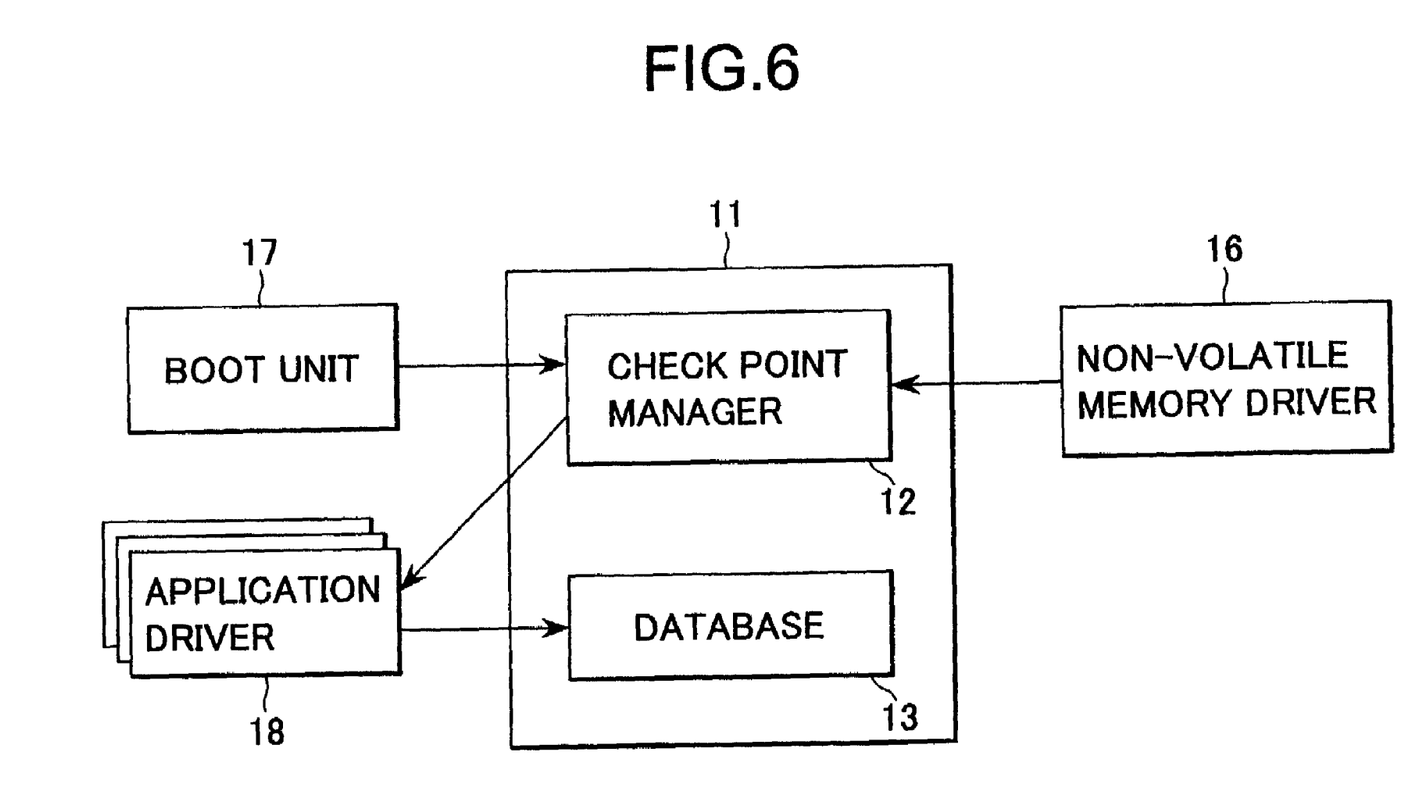
FIG. 6 is a schematic diagram describing a relation between modules for a system status recovering process according to another preferred embodiment of the present invention.

A system status recovering process will be described below with reference to FIG. 6. FIG. 6 shows a relation between the modules to be executed by the CPU 1, which exist on the memory that can be accessed by the CPU 1. A booting unit 17 of the system outputs a request for the status recovering process to the check point manager 12. In accordance with this request for the status recovering process, the check point manager 12 requests the non-volatile memory driver 16 to read the snap shot file. As mentioned above, the dependency relation between the components are reflected in the snap shot file. The check point manager 12 retrieves a component of an application device driver 18 having its status recovered, from the component name stored in the snap shot file, and firstly reads the component as necessary, and carries out booting.

Then, an address of a function to be called from a symbol information held by the component is obtained through the non-volatile memory driver 16 from the recording medium, and the function is called from the address. The function to be called exists for each component in a particular address. Those processes are executed for all the components stored in the snap shot file. By the way, at this time, the dependency relation between the components is recorded in the status-storing database 13 within this module 11 by the component itself. The content recorded in this status-storing database 13 is accessed at the time of a further request for the status-storing process.

By the way, the status recovering process can be carried out not only at the time of the booting of the system but also an arbitrary timing. However, once the status recovering process is activated, a next request for the status recovering process is kept standing by until an end of the previous status recovering process.

Figure 7:
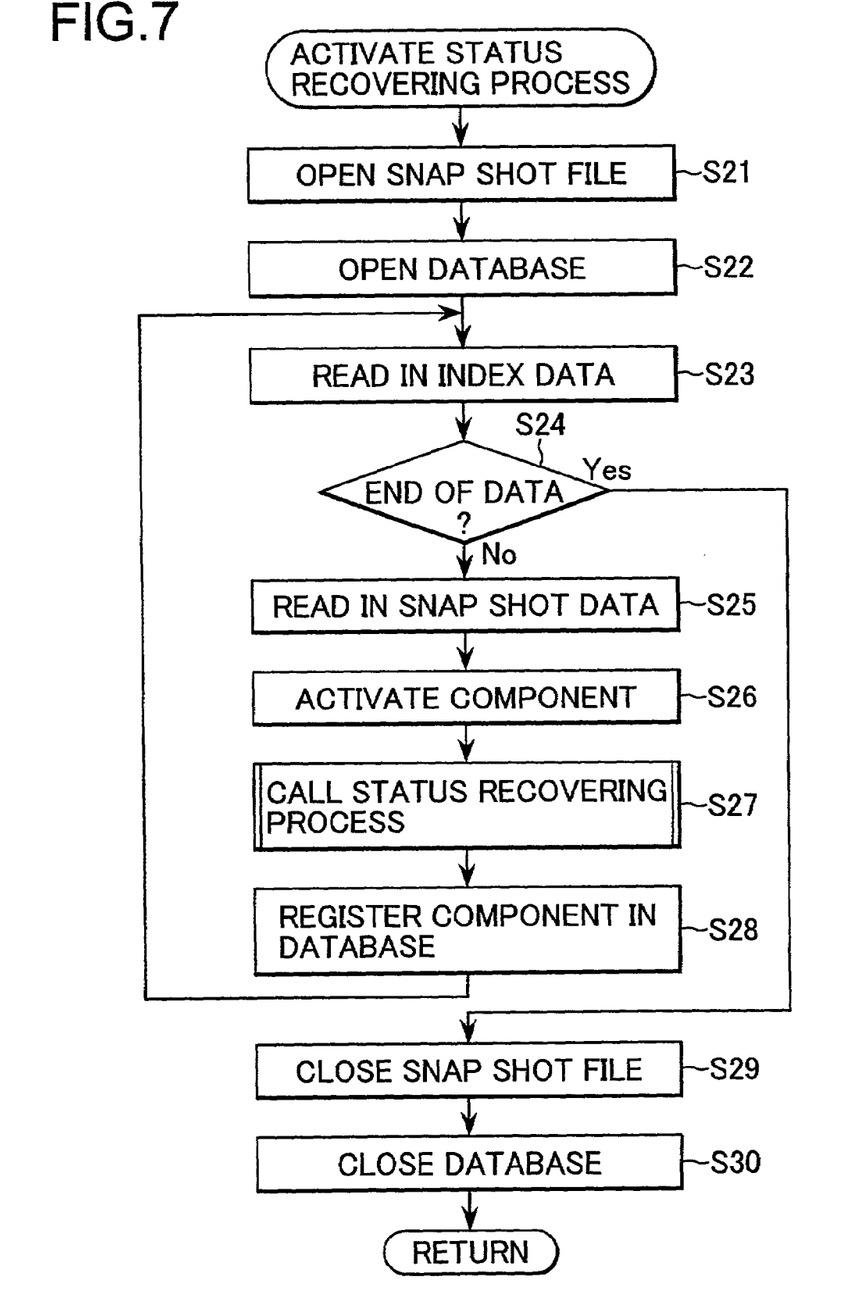
FIG. 7 is a flowchart describing an example of a status recovering process according to a preferred embodiment of the present invention.

An example of the system status recovering process will be described below with reference to a flowchart of FIG. 7. At a step S21, the snap shot file stored in the recording medium by the non-volatile memory driver 16 is opened. At a step S22, the status-storing database 13 is opened. At a step S23, the index data stored in the recording medium by the non-volatile memory driver 16 is read in. At a step S24, it is judged whether or not the component that needs to be read is ended, in accordance with the stored index data. If it is judged in accordance with the index data that the component that needs to be read is not still ended, the control proceeds to a step S25. If it is judged that all the components that need to be read are ended, the control proceeds to a step S29.

At step S25, the stored snap shot data is read from the recording medium through the non-volatile memory driver 16. At a step S26, the component is read in accordance with the read in snap shot data, and it is activated. At a step S27, the status recovering process is carried out. Actually, the address of the function to be read out is obtained from the symbol information held by the component. Then, the function is called from the address. The function to be called exists for each component in a particular address. At a step S28, the component itself and the dependency relation between components are recorded in the status-storing database 13 within this module 11 by the component itself. Then, the control returns back to the step S23.

At a step S29, the snap shot file stored in the recording medium by the non-volatile memory driver 16 is closed. At a step S30, the status-storing database 13 is closed.

In this preferred embodiment of the invention, even if the application operates on the system, the status-storing operation can be executed in the background without an operator operating the system taking notice of such operation.

This preferred embodiment of the present invention can be applied to any apparatus if it has the configuration shown in FIG. 1. For example, this embodiment can be applied to a portable telephone, PDA (Personal Digital Assistant), a notebook PC or the like.

In the preferred embodiment present here, if the recording medium in which the snap shot file is stored by the non-volatile memory driver 16, for example, an IC card is inserted into a PC different from a PC in which the snap shot file is stored, and the status recovering process is then carried out, the PC into which the IC card is inserted can be used in an environment completely equivalent to that of the PC in which the snap shot file is stored.

According to the preferred embodiments of present invention, it is possible to carry out booting of a device in accordance with the dependency relation of the device, when the power supply is again turned on, and it is further possible to recover the original status at a high speed.

Moreover, according to the preferred embodiments present invention, the data required to recover a status of a certain component is shunted or recovered by the component itself. Thus, recovering can be attained at a minimum necessary small amount of data.

Also, according to the preferred embodiments of the present invention, as the information for the recovery is stored in a portable memory device, if the memory device is connected to another apparatus, the status can be recovered at a high speed.

Moreover, according to the present invention, the status can be recovered not only at the time of the booting of the system but also an arbitrary timing.

Although the present invention been described in its preferred form with a certain degree of particularity, obviously many changes, variations, combinations and sub-combinations are possible therein. It is therefore to be understood that any modifications will be practiced otherwise than as specifically described herein without departing from the scope of the present invention.

What is claimed is:

1. A data processing apparatus having a central processing unit and a memory, wherein a plurality of modules exist in the memory for access by the central processing unit, with each module having a plurality of components, said apparatus comprising:

a memory driver for controlling operations of writing to and reading from a recording medium;

a check point manager unit for communicating between the plurality of components and the memory driver; and a status storing database unit for storing a dependency relationship for each component relative to others of the plurality of components, wherein when a status-storing process is requested by one component of the plurality of components, the dependency relationship of said one component is read from said status storing database unit and storing data as a snapshot file in said recording medium in a sequence based on the dependency relationship from said status storing database unit; and when a status-recovering process is requested, a status of said one component is recovered using said snapshot file stored in said recording medium in the sequence based on the dependency relationship.

2. The data processing apparatus according to claim 1, wherein said snapshot file includes a tag having one of a name and an identification of said component.

3. The data processing apparatus according to claim 1, wherein said status-storing process and said status-recovering process call a function existing in an address for said component.

4. The data processing apparatus according to claim 1, wherein said recording medium is a portable recording medium.

5. A data processing method including a central processing unit and a memory, wherein a plurality of modules exist in the memory for access by the central processing unit, with each module having a plurality of components, said method comprising the steps of:

controlling writing to and reading from a recording medium, said controlling performed by a memory driver;

communicating between the plurality of components and the driver by using a checkpoint manager;

storing a dependency relationship for each component relative to others of the plurality of components in a status-storing database;

storing data as a snapshot file in said recording medium in a sequence based on the dependency relationship when a status-storing process is requested by the component; and recovering a status of said component using said snapshot file stored in said recording medium in a sequence based on the dependency relationship when a status-recovering process is requested.

6. The data processing method according to claim 5, wherein said snapshot file includes a tag having one of a name and an identification of said component.

7. The data processing method according to claim 5, wherein said status-storing processing and said status-recovering process call a function existing in an address for said component.

8. The data processing method according to claim 5, wherein said recording medium is a portable recording medium.

9. A computer-readable storage medium having instructions thereon which when executed by a computer, performs a data processing method applied to an apparatus including a central processing unit and a memory, wherein the plurality of modules exist in the memory for access by the central processing unit with each module having a plurality of components, said instructions comprising the steps of:

controlling writing to and reading from a recording medium, said controlling performed by a memory driver;

communicating between the plurality of components and the driver by using a checkpoint manager;

storing a dependency relationship among the plurality of components in a status-storing database;

storing data as a snapshot file in said recording medium in a sequence based on the dependency relationship when a status-storing process is requested by said component; and recovering a status of said component using said snapshot file stored in said recording medium in a sequence based on the dependency relationship stored in said recording medium when a status-recovering process is requested.

* * * * *